United States Patent [19]

Nelson

[11] Patent Number: 4,729,257
[45] Date of Patent: Mar. 8, 1988

[54] BALANCED STEERABLE TRANSMISSION

[76] Inventor: Donald F. Nelson, 7560 Kentwood Ct., Gilroy, Calif. 95024

[21] Appl. No.: 889,774

[22] Filed: Jul. 28, 1986

[51] Int. Cl.$^4$ .................. F16H 37/06; F16H 1/40; F16H 1/42
[52] U.S. Cl. .................. 74/675; 74/720.5; 74/705; 74/713; 74/714
[58] Field of Search ............ 74/665 L, 665 M, 665 N, 74/675, 679, 705, 713, 714, 720, 720.5; 180/6.44

[56] References Cited

U.S. PATENT DOCUMENTS

| 1,720,018 | 7/1929 | Tubbs | 74/675 |
| 1,984,830 | 12/1934 | Higley | 74/720.5 X |
| 1,991,094 | 2/1935 | Higley | 74/720.5 X |
| 2,047,050 | 7/1936 | Armington | 74/675 |
| 2,196,368 | 4/1940 | Thomson | 74/675 |
| 3,015,971 | 1/1962 | Sauer et al. | 74/675 X |
| 3,530,741 | 9/1970 | Charest | 74/675 |
| 3,750,616 | 8/1973 | Nelson | 115/35 R |
| 3,799,284 | 3/1974 | Hender | 74/675 X |
| 3,818,782 | 6/1974 | Armasow | 74/720.5 |
| 3,851,614 | 12/1974 | Nelson | 115/35 |
| 4,471,669 | 9/1984 | Seaberg | 74/714 X |
| 4,497,218 | 2/1985 | Zannberger | 74/714 X |

FOREIGN PATENT DOCUMENTS

| 1129068 | 5/1962 | Fed. Rep. of Germany | 74/720.5 |
| 2800487 | 8/1978 | Fed. Rep. of Germany | 180/6.44 |
| 1057780 | 5/1955 | France | 180/6.44 |
| 323334 | 12/1934 | Italy | 180/6.44 |
| 0018135 | 2/1978 | Japan | 180/6.44 |

OTHER PUBLICATIONS

M. Bargo, Jr. "All-Gear Steering" Popular Science, Jul. 1985, pp. 60, 61, and 62.

Primary Examiner—Dirk Wright
Attorney, Agent, or Firm—Christie, Parker & Hale

[57] ABSTRACT

Tracked vehicles are steered by the differential speed between the two tracks. This transmission has two output drive shafts which can be driven at different speeds for controlling such a tracked vehicle. Identical drive trains are provided between an input shaft and each of the two output shafts. The drive trains each include transfer gears mounted on a pivotable spider. A second input rotates the spider. One input shaft is used for driving the two output shafts. Rotation of the other input shaft adds to the rotational speed of one output shaft and subtracts from the rotational speed of the other output shaft. By using identical drive trains and transfer gears on a spider in each of the drive trains, the transmission is balanced so that substantially the same torque is required for changing the speed of both drive trains.

16 Claims, 4 Drawing Figures

BALANCED STEERABLE TRANSMISSION

FIELD OF THE INVENTION

This invention concerns a transmission having one power input and two power outputs, with a steering input which permits the two power outputs to be driven at different speeds. Such a transmission is usable for steering tracked vehicles or the like.

BACKGROUND

Steering of tracked vehicles such as crawlers used as bulldozers, military tanks, and the like is quite different from steering of wheeled vehicles such as automobiles. One cannot simply turn the "front wheels" on a tracked vehicle to effect steering. When the two tracks on a vehicle are driven at the same speed, the vehicle proceeds in a straight line. If one track is operated at a higher speed than the other track, the vehicle turns in the direction of the slower moving track with some sideways slippage of the tracks. The ultimate "steering" is when one track is driven forward and the other track is driven in the reverse direction, which may permit a vehicle to essentially turn on its own center. Such steering is not limited to tracked vehicles, but is sometimes used on short wheel base, highly maneuverable, wheeled vehicles and for some amphibious vehicles.

The ordinary way of steering a tracked vehicle employs a clutch and brakes on each track. To turn, the driver disengages the clutch on one track and may simultaneously brake that track, which jerks the vehicle toward the direction of the unpowered track. Such a system is simple and straightforward but requires a skilled operator to coordinate the clutching and braking to achieve the desired steering.

Modern military vehicles provide much smoother turning by employing separate automatic transmissions for each of the two tracks. Such automatic transmissions are large and costly, both to purchase and maintain.

An all-gear steerable transmission system has been proposed which is, in effect, two truck differentials back-to-back and suitably geared together. The principal driving power is applied to one differential and steering power is applied to the other differential. This technique is described in "All Gear Steering" by Michael Bargo, Jr., *Popular Science*, July 1985, pages 60 to 62.

It is significant that any steering system for a tracked vehicle be balanced, that is, it should be no harder to turn the vehicle in one direction than it is to turn the vehicle in the other direction.

Still further improvements can be made in all-gear drive systems for tracked vehicles. For example, by splitting the applied input power to two separate drive trains before steering, size and weight reductions can be made.

BRIEF SUMMARY OF THE INVENTION

There is therefore, provided in practice of this invention according to a presently preferred embodiment, a dynamically balanced steerable power transmission having a pair of output shafts with identical output gears and a first input shaft and gear. A pair of identical drive trains are provided between the first input gear and the two output gears. A spider is mounted for pivoting around an axis coaxial with one of the output shafts and a second input gear is coupled to the spider for pivoting the spider. Two sets of transfer gears are mounted on the spider in the two drive trains for rotating the respective output gears in response to rotation of the first input gear. The transfer gears precess relative to the output gears in response to pivoting of the spider, thereby changing the speeds of the two output shafts.

DRAWINGS

These and other features and advantages of the present invention will be appreciated as the same becomes better understood by reference to the following detailed description when considered in connection with the accompanying drawings wherein.

DESCRIPTION

Figure 1:
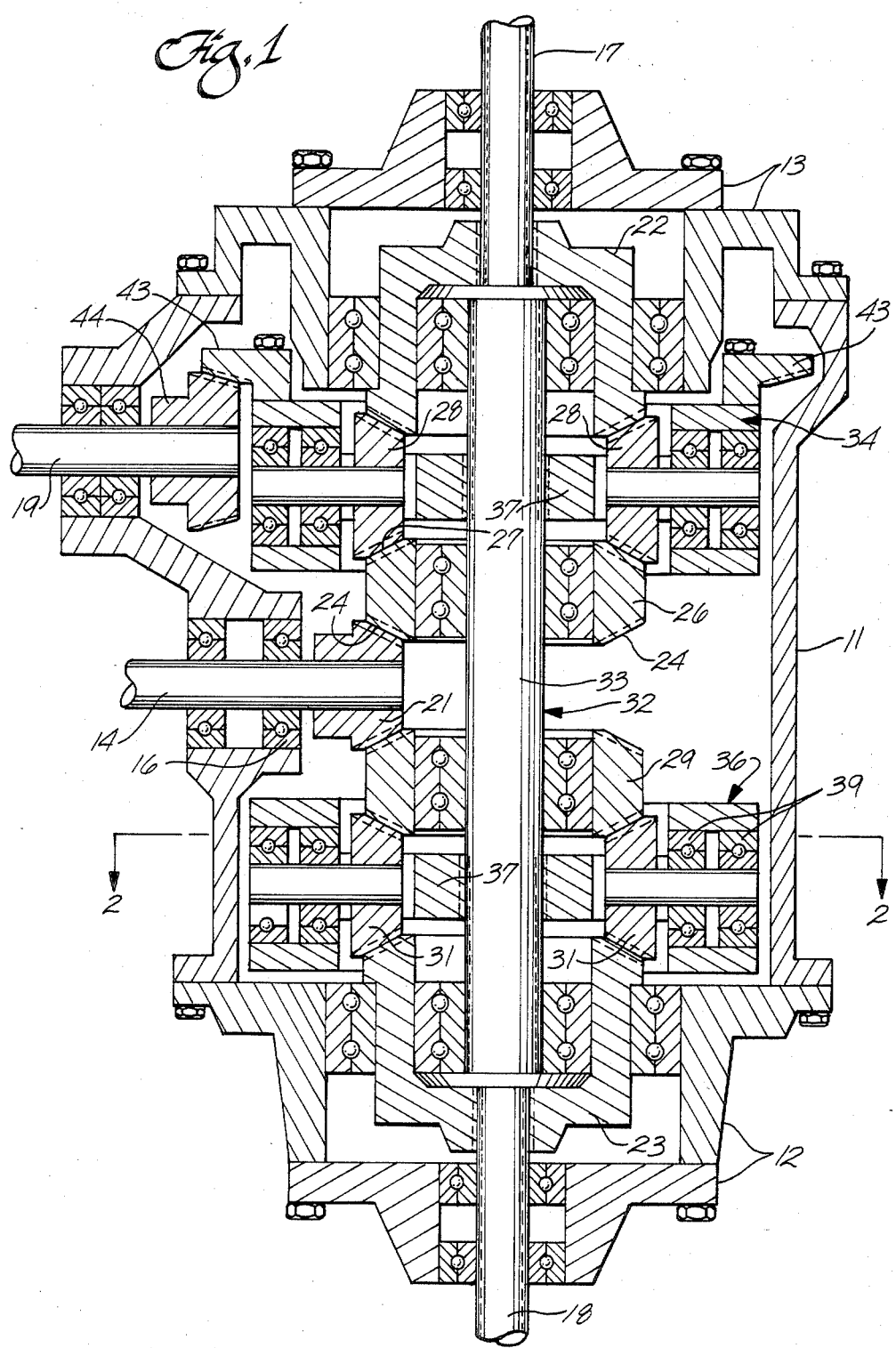
FIG. 1 illustrates schematically in longitudinal cross section a balanced steerable transmission constructed according to principles of this invention.

One embodiment of a balanced steerable power transmission is illustrated partially schematically in longitudinal cross section in FIG. 1. As illustrated in this view the housing of the transmission comprises a main casing 11 closed at the bottom by a two-piece lower cover 12 and at the top by a two-piece upper cover 13. As used herein, the designations of top and bottom of the transmission are used with respect to the drawings. This is done for convenience in the description and there is no relation to the orientation of the transmission in service. In practice the transmission can be oriented in any direction. In service in a tracked vehicle, for example, the plane of the transmission illustrated in FIG. 1 is horizontal.

It should be understood that the housing is illustrated only schematically and may be assembled out of additional components as required to ease assembly, maintenance and the like.

The transmission has a first input shaft 14 extending through one side of the main casing and supported therein by ball bearings or the like 16. Many other members of the transmission are also mounted by ball bearings indicated schematically in the drawing. In general these are not further referred to in this description since conventional in nature. Other types of bearings as may be required or desired for carrying thrust as well as radial loads may be used. It will also be apparent that grease seals and the like are employed at the openings through which shafts pass. Various bolts, snap rings, keys and similar conventional devices have also been omitted from the drawings for clarity.

A first output shaft 17 extends through the housing in one direction and a second output shaft 18 extends through the housing in the opposite direction. In this embodiment the two output shafts are coaxial. In a tracked vehicle the output shafts are coupled to the drive sprockets for the two tracks for rotating the sprockets and driving the vehicle. A second input shaft 19 also extends through the housing. The two input shafts are used for the main driving power for the tracks and for a lesser power for steering.

A description of the embodiment illustrated in FIG. 1 assumes that driving power is applied by way of the first input shaft 14 and that steering is provided by way of the second input shaft 19. Alternatively, driving power may be applied by way of the second input shaft with steering provided by way of the first input shaft. To help in maintaining a distinction for purposes of the description the elements of the transmission coupled to one input shaft are referred to as being "rotated" whereas those elements coupled to the other input shaft may be referred to as "pivoted". These terms should not be interpreted as a limitation on the speed of rotation but are employed for purposes of clarity in the description. Whichever of the shafts is rotated to provide driving power will, in general, rotate at a higher speed than the other input shaft used for steering.

The first input shaft 14 drives a first input gear 21. The upper or first output shaft 17 has a first output gear 22. Similarly, the lower or second output shaft 18 has a second output gear 23. Identical drive trains interconnect the first input gear 21 and the two output gears 22 and 23.

The first input gear has a bevel gear face engaging an input face 24 of a double-face gear 26. An output face 27 on the double-face gear engages a pair of transfer bevel gears 28. The transfer gears in turn mesh with the gear face on the first output gear 22.

The first input gear 21 also engages an input bevel gear face on a second double-face gear 29. The output face of the double-face gear engages a second pair of transfer bevel gears 31. The second set of transfer gears is in engagement with the second output gear 23. This second drive train 29, 31, 22 is identical to the first drive train 26, 28, 23.

A spider 32 is mounted in the housing for pivoting about an axis coaxial with the two output shafts. In this embodiment the spider has a mounting shaft 33 on which are securely mounted a first hub 34, and spaced apart therefrom, a second hub 36 (also seen in FIG. 2). The hubs are secured to the spider shaft 33 by splines or keys so as to rotate with the shaft.

Each of the hubs comprises a central plate 37 surrounded by an enlarged rim 38. The second rim supports bearings 39 which in turn support shafts 41 on which are mounted the two transfer gears 31 in the second drive train. Windows 42 through the hub provide clearance for the transfer gears. The first hub 34 provides similar support for the first set of transfer gears 28. The transfer gears rotate about axes perpendicular to the axis of rotation of the spider.

A spider bevel gear is secured to one of the hubs 43 and is engaged by a second input bevel gear 44 on the second input shaft 19. Thus, pivoting of the input shaft 19 results in pivoting of the spider.

To explain operation of the transmission it is first assumed that the first input shaft 14 is rotated and the second input shaft 19 remains stationary. The first input gear 21 causes rotation of the first double-face gear 26. The first transfer gears 28 meshed therewith cause the first output gear 22 to rotate in the opposite direction from the first double-face gear.

The first input gear also rotates the second double-face gear, but in the opposite direction from the rotation of the first double-face gear. The second transfer gears 31 reverse this direction of rotation in causing the second output gear to rotate. Thus, the two output shafts 17 and 18 rotate at the same speed but in opposite directions. When used for driving a tracked vehicle, a reversing gear assembly (not shown) reverses the direction of rotation of one of the output shafts before application to the drive sprocket.

Next it is assumed that the first input shaft is stationary and the second input shaft 19 is rotated or pivoted. This pivoting directly induces pivoting of the spider by way of the spider bevel gear 43. Since the first input gear 21 is stationary, the two double-face gears 26 and 29 are also stationary. Pivoting of the spider pivots the axis of rotation of the transfer gears 28 and 31 around the spider axis. The sets of transfer gears precess around the respective double-face gear. This precession results in rotation of the output gear at a rate twice the rate of rotation of the spider. Since both sets of transfer gears are similarly mounted on the spider which rotates as a single unitary body, the resultant direction of rotation of the two output shafts is the same.

When both input shafts are rotated, the same type of changes occur in rotational speed as outlined in the two previous assumptions. The two effects are additive. Since rotation of the first input shaft causes rotation of the two output shafts in opposite directions and rotation of the second output shaft causes rotation of both output shafts in the same direction, rotation of both input shafts simultaneously results in an increase in rotational speed of one shaft and concomitant decrease in speed of rotation of the other shaft. Since the two drive trains between either input shaft and the two output shafts are identical, the transmission is balanced. That is, it is equally easy to speed up one input shaft as it is to speed up the other regardless of the direction of rotation of the other input shaft.

Since the effects of rotating the two input shafts are additive, either shaft may be used for the principal driving power and the other shaft used for steering. When the first input shaft 14 is used for driving power, the two output shafts contra-rotate and reversing gears or the like are used between one of the shafts and its track driving sprocket. When the second input shaft 19 is used for driving power, the two output shafts rotate in the same direction. When the second input shaft is used for driving power, the spider tends to rotate at a higher speed than when this shaft is used for steering. The choice of which shaft is used for power and which one is used for steering depends on such factors, plus the ease of obtaining desired gear ratios, torque ranges and the like. Variations can be made in the transmission, if desired. For example, one or two idler gears may be provided in engagement with the input faces 24 of the double-face gears 26 and 29 on the opposite side from the first input gear 21 for balancing off-center loading. Other arrangements may be used for rotating or pivoting the spider. One may, for example, position a gear in the center of the spider shaft 33. This gear can then be driven by a second input shaft (not shown) extending through the housing in a different direction from the first input shaft 14. In such an embodiment the large spider bevel gear 43 and the second input gear driving it can be deleted. A more symmetrical housing can then be used. Other modifications and variations will be apparent to one skilled in the art.

Figure 2:
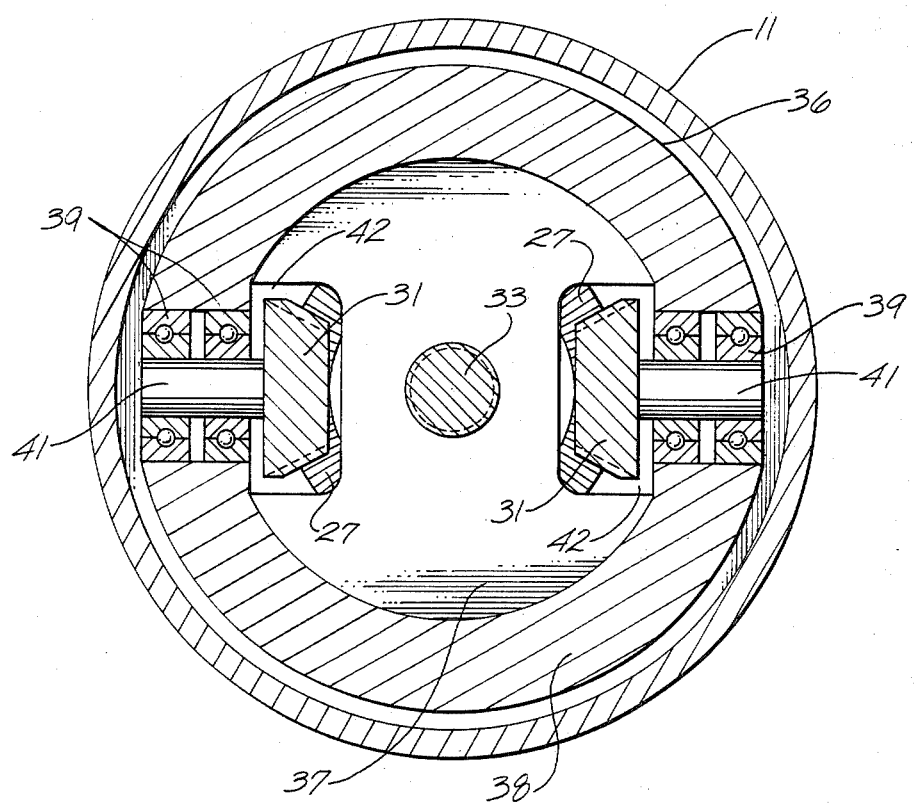
FIG. 2 is a schematic transverse cross section of the transmission at line 2—2 of FIG. 1.
Figure 3:
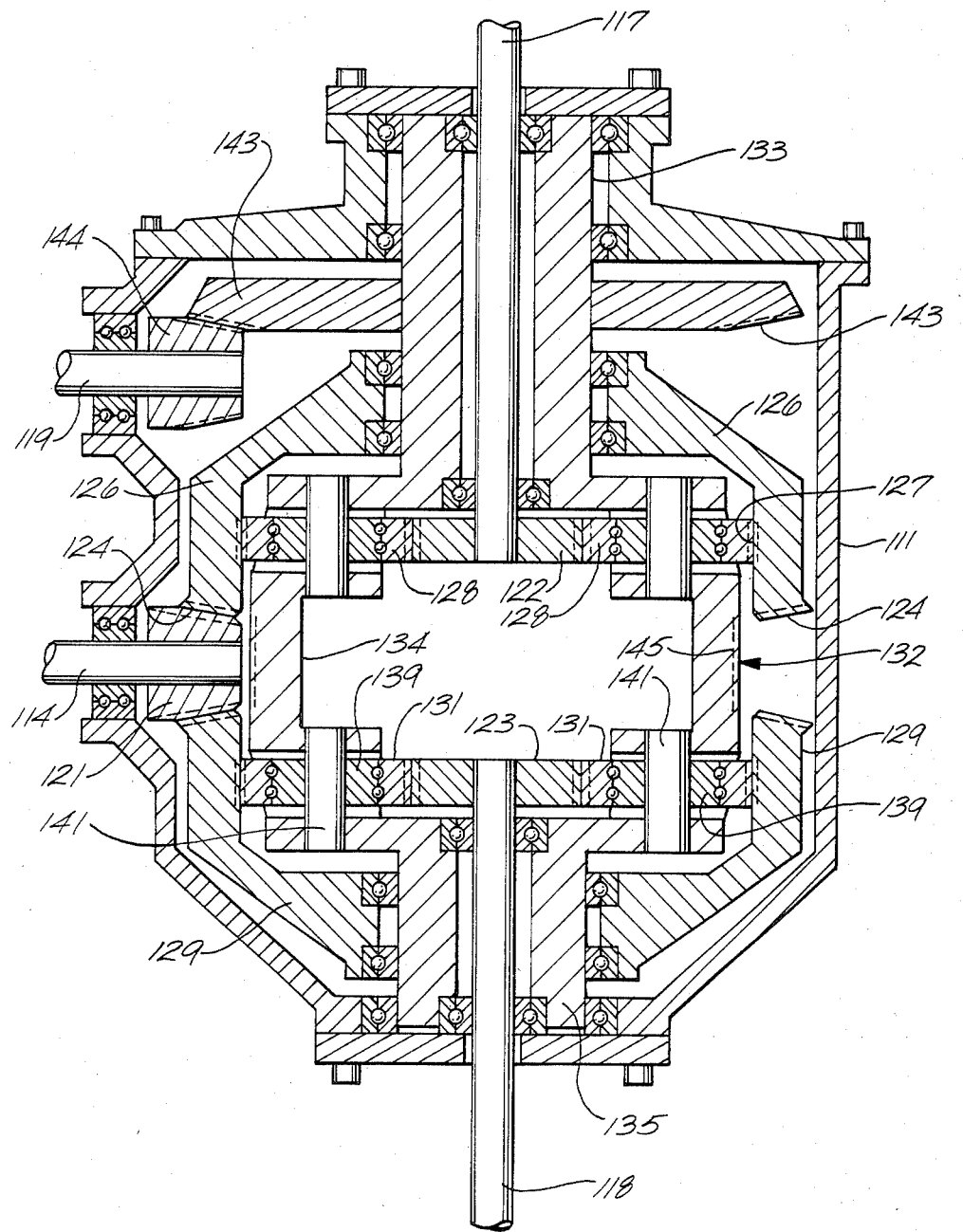
FIG. 3 is a longitudinal cross section of another embodiment of transmission constructed according to principles of this invention.

FIG. 3 illustrates another embodiment of balanced steerable transmission constructed according to principles of this invention. Operating principles of this embodiment are similar to those in the embodiment illustrated in FIGS. 1 and 2. Because of such similarities the elements of this embodiment are identified with reference numerals like those used in the first embodiment and increased by 100. Thus, in this embodiment the transmission is housed in a casing 111, while the embodiment in FIG. 1 is in a casing 11.

A first input shaft 114 extends through the housing of the transmission and supports a first input gear 121. Output from the transmission is by way of coaxial output shafts 117 and 118. One of the output shafts 117 has a first output spur gear 122 and the second output shaft 118 has a second output spur gear 123. The first input gear 121 engages the input face 124 of a first double-face gear 126. The output face 127 of the double-face gear is an internal ring gear. A first set of transfer spur gears 128 engages the output ring gear face 127 and the first output gear 122. The transfer gears are planetary gears for precession around the first output gear 122 as a sun gear.

The first input bevel gear 121 also engages the input face of a second double-face gear 129. The internal ring gear face on the second double-face gear engages a second set of transfer spur gears 131. The second set of transfer gears are planetary gears around the second output gear 123 as a sun gear.

The transfer gears 128 and 131 are mounted on a pivotable spider 132. The spider has a central hub 134 between spider shafts 133 and 135 which support the spider in the casing of the transmission. The second set of transfer gears are rotatably supported by ball bearings or the like 139 mounted on a shaft 141 secured in the hub 134 of the spider. A similar mounting arrangement is employed for the first set of transfer gears 128. The axes of the supporting shafts 141 are parallel to the axis of the spider and output shafts, and offset therefrom. When the spider rotates or pivots, the mounting of the transfer gears also rotates around the spider axis.

A spider bevel gear 143 is secured on one shaft 133 of the spider. This bevel gear engages a second input gear 144 driven by a second input shaft 119. When the second input shaft is rotated, the spider is thereby rotated.

Operation of the second embodiment of transmission is generally similar to operation of the first embodiment illustrated in FIGS. 1 and 2. It is first assumed that the first input shaft 114 is rotated and the second input shaft 119 remains stationary. The first input gear 121 causes rotation of the first double-face gear 126. The first transfer gears 128 meshed therewith cause the first output gear 122 to rotate in the opposite direction from the first double-face gear.

The first input gear also rotates the second double-face gear, but in the opposite direction from the rotation of the first double-face gear. The second transfer gears 131 reverse this direction of rotation in causing the second output gear to rotate. Thus, the two output shafts 117 and 118 rotate at the same speed but in opposite directions.

Next it is assumed that the first input shaft is stationary and the second input shaft 119 is rotated or pivoted. This pivoting directly induces pivoting of the spider by way of the spider bevel gear 143. Since the first input gear 121 is stationary, the two double-face gears 126 and 129 are also stationary. Pivoting of the spider pivots the axis of rotation of the transfer gears 128 and 131 around the spider axis. The sets of transfer gears precess as sun gears around the respective double-face gear. This precession results in rotation of the output gear at a rate twice the rate of rotation of the spider. Since both sets of transfer gears are similarly mounted on the spider which rotates as a single unitary body, the resultant direction of rotation of the two output shafts is the same.

When both input shafts are rotated, the same type of changes occur in rotational speed as outlined in the two previous assumptions. The two effects are additive. Since rotation of the first input shaft causes rotation of the two output shafts in opposite directions and rotation of the second output shaft causes rotation of both output shafts in the same direction, rotation of both input shafts simultaneously results in an increase in rotational speed of one shaft and concomitant decrease in speed of rotation of the other shaft. Since the two drive trains between either input shaft and the two output shafts are identical, the transmission is balanced. Since the effects of rotating the two input shafts are additive, either shaft may be used for the principal driving power and the other shaft used for steering.

Variations can also be made in the design of the transmission illustrated in FIG. 3. The spider bevel gear 143 and second input gear 144 can be deleted so that a substantially symmetrical housing can be provided. Drive for the spider is readily provided by way of a shaft (not shown) entering the housing on an axis perpendicular to the spider axis and bearing a gear (not shown) engaging a gear face 145 in the center of the spider hub 134. A worm gear or bevel gear can be used for such drive. Various dimensional changes can readily be made to obtain the desired gear ratios.

Figure 4:
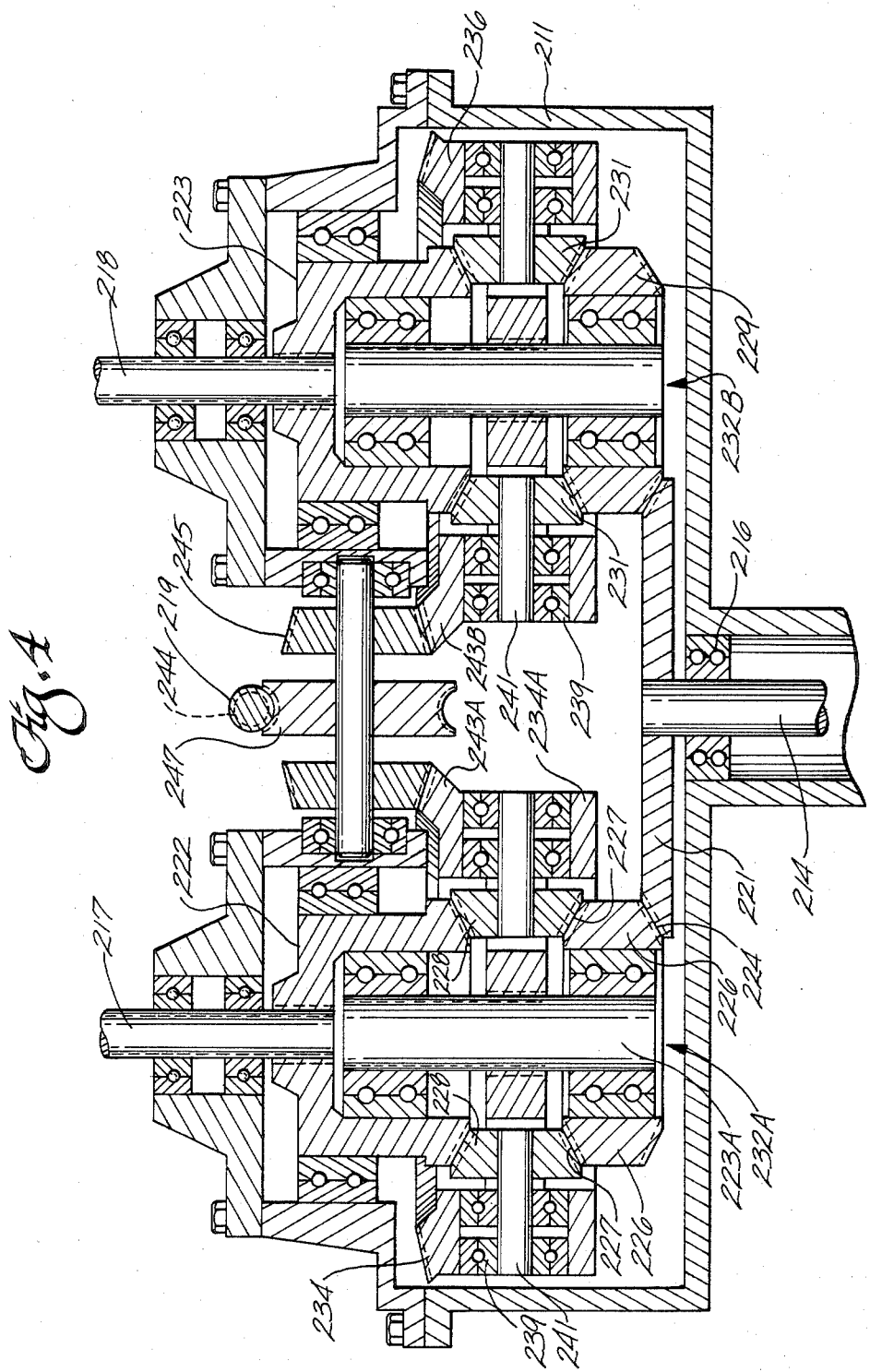
FIG. 4 is a cross section through still another embodiment of transmission constructed according to principles of this invention.

FIG. 4 illustrates schematically in longitudinal cross section another embodiment of balanced steerable transmission constructed according to principles of this invention. Since this embodiment has many parts similar to the embodiment illustrated in FIGS. 1 and 2, similar reference numerals increased by 200 are employed for identifying similar parts. Thus, the main housing for the transmission in this embodiment is identified as 211 and the housing in the embodiment of FIG. 1 is identified with the reference numeral 11.

This embodiment differs from the embodiment illustrated in FIG. 1 by having first and second output shafts 217 and 218 which are parallel to and offset from each other.

The transmission has a first input shaft 214 extending through one side of the main casing and supported therein by ball bearings or the like 216.

The first output shaft 217 extends through the housing in one direction and the second output shaft 218 extends through the housing in the same direction and offset from the first output shaft. A second input shaft 219 also extends through the housing (not shown in this view). The two input shafts are used for the main driving power for the tracks and for a lesser power for steering.

The first input shaft 214 drives a first input gear 221. The first output shaft 217 has a first output gear 222. Similarly, the second output shaft 218 has a second output gear 223. Identical drive trains interconnect the first input gear 221 and the two output gears 222 and 223.

The first input gear has a bevel gear face engaging an input face 224 of a double-face gear 226. An output face 227 on the double-face gear engages a pair of transfer bevel gears 228. The transfer gears in turn mesh with the gear face on the first output gear 222.

The first input gear 221 also engages an input bevel gear face on a second double-face gear 229. The output face of the double-face gear engages a second pair of transfer bevel gears 231. The second set of transfer gears is in engagement with the second output gear 223. This second drive train 229, 231, 222 is identical to the first drive train 226, 228, 223.

A first half of a spider 232A is mounted in the housing for pivoting about an axis coaxial with the first output shaft 217. In this embodiment the spider half 232A has a mounting shaft 233A. A hub 234A is mounted on the shaft 233A by splines or a key so as to rotate with the shaft. The hub supports bearings 239 which in turn support shafts 241 on which are mounted the two transfer gears 228 in the first drive train.

The transmission has a second spider half 232B substantially identical to the first spider half 232A. The second spider half provides support for the second set of transfer gears 231 in the same manner as the first spider half supports the first set of transfer gears. The transfer gears rotate about axes perpendicular to the axis of rotation of the respective spider.

Spider bevel gears 243A and 243B are secured to the respective spider halves 232A and 232B. These spider bevel gears are engaged by a pair of coordinator bevel gears 245 mounted on a common shaft 246. A drive gear 247 is secured to the same shaft and is driven by an input worm gear 244 on a second input shaft 219. Pivoting of the second input shaft 219 results in pivoting of the drive gear and two coordinator gears, hence of the two spider bevel gears and the two halves of the spider.

To explain operation of this embodiment of transmission it is first assumed that the first input shaft 214 is rotated and the second input shaft 219 remains stationary. The first input gear 221 causes rotation of the first double-face gear 226. The first transfer gears 228 meshed therewith cause the first output gear 222 to rotate in the opposite direction from the first double-face gear.

The first input gear also rotates the second double-face gear, and since it is on what amounts to the opposite edge of the second double-face gear from the first double-face gear, the directions of rotation of the two double-face gears is the same. The second transfer gears 231 reverse this direction of rotation in causing the second output gear to rotate. Thus, the two output shafts 217 and 218 rotate at the same speed and in the same direction. That is, both output shafts rotate clockwise or both output shafts rotate counter-clockwise.

Next it is assumed that the first input shaft is stationary and the second input shaft 219 is rotated or pivoted. This pivoting directly induces coordinated pivoting of the two spider halves by way of the coordinator gears 245 and the spider bevel gears 243. Since the first input gear 221 is stationary, the two double-face gears 226 and 229 are also stationary. Pivoting of the spider halves pivots the axes of rotation of the transfer gears 228 and 31 around the axes of the respective halves of the spider. The sets of transfer gears thus precess around the respective double-face gear. This precession results in rotation of the output gear at a rate twice the rate of rotation of the spider. Since both sets of transfer gears are similarly mounted on the spider, the two halves of which rotate in opposite directions are driven by the coordinator gears, the resultant directions of rotation of the two output shafts are also opposite. That is, one shaft rotates clockwise while the other rotates counter-clockwise.

When both input shafts are rotated, the same type of changes occur in rotational speed as outlined in the two previous assumptions. The two effects are additive. Since rotation of the first input shaft causes rotation of the two output shafts in the same direction and rotation of the second output shaft causes rotation of the output shafts in opposite directions, rotation of both input shafts simultaneously results in an increase in rotational speed of one shaft and concomitant decrease in speed of rotation of the other shaft.

Since the two drive trains between either input shaft and the two output shafts are identical, the transmission is balanced. That is, it is equally easy to speed up one input shaft as it is to speed up the other regardless of the direction of rotation of the other input shaft. Since the effects of rotating the two input shafts are additive, either shaft may be used for the principal driving power and the other shaft used for steering.

Variations can also be made in this embodiment of transmission, if desired. For example, a worm gear has been described and illustrated for rotating the spider. Higher speed driving can be obtained with other types of gearing. Planetary gear arrangements such as those illustrated in FIG. 2 may be used in this embodiment. Many other modifications and variations of transmissions constructed according to principles of this invention will be apparent to one skilled in the art. It is, therefore, to be understood that within the scope of the appended claims the invention may be practiced otherwise than as specifically described.

What is claimed is:

1. A balanced steerable power transmission suitable for tracked vehicles or the like comprising:
   a housing;
   a first input shaft extending through the housing and having a first input gear;
   a first output shaft extending through the housing and having a first output gear;
   a second output shaft extending through the housing coaxial with the first output gear and having a second output gear;
   a first drive train between the first input gear and the first output gear for rotating the first output shaft in response to rotation of the first input gear;
   a second drive train between the first input gear and the second output gear for rotating the second output shaft in response to rotation of the first input gear, the second drive train being substantially identical to the first drive train;
   a spider mounted in the housing for pivoting as a single unit about an axis coaxial with the output shafts;
   a second input shaft extending through the housing and having a second input gear coupled directly to the spider for pivoting the spider;
   the first drive train comprising first transfer gear means for rotating the first output gear in response to rotation of the first input gear;
   the second drive train comprising second transfer gear means for rotating the second output gear in the opposite direction from the first output gear in response to rotation of the first input gear;
   means for mounting the first transfer gear means on the spider for precessing relative to the first output gear in response to pivoting of the spider; and
   means for mounting the second transfer gear means on the spider for processing relative to the second output gear in response to pivoting of the spider in the same direction as precessing of the first transfer gear means.

2. A transmission as recited in claim 1 wherein the first drive train comprises a first double-face gear engaging the first input gear and the first transfer gear means; and the second drive train comprises a second double-face gear engaging the first input gear and the second transfer gear means.

3. A transmission as recited in claim 2 wherein the first transfer gear means comprises at least a pair of bevel gears engaging the first double-face gear and the first output gear, and the second transfer gear means comprises at least a pair of bevel gears engaging the second double-face gear and the second output gear.

4. A transmission as recited in claim 1 wherein the spider comprises a shaft and a pair of spaced apart identical hubs wherein the first transfer gear means is mounted on a first one of said hubs and the second transfer gear means is mounted on the second of said hubs.

5. A transmission as recited in claim 1 wherein each drive train comprises a ring gear, the output gear is a sun spur gear, and the transfer gear means comprises at least a pair of planetary spur gears engaging the ring gear and the output sun gear.

6. A transmission as recited in claim 1 wherein the spider comprises a shaft and a central hub and wherein the first and second transfer gear means are mounted on said hub.

7. A balanced steerable transmission suitable for tracked vehicles or the like comprising:
   a housing;
   a first output drive shaft extending through the housing in one direction;
   a first output gear on the first output shaft;
   a second output drive shaft extending through the housing in a second direction;
   a second output gear identical to and coaxial with the first output gear on the second output shaft;
   a first double-face gear having an input face and an output face coaxial with the output gears;
   a second double-face gear having an input face and an output face coaxial with the output gears, the second double-face gear being identical to the first double-face gear;
   a first input gear for driving the input faces of the double-face gears in opposite directions;
   a spider mounted in the housing for pivoting as a single unit around an axis coaxial with the output shafts;
   first transfer gear means mounted on the spider for pivoting with the spider, the first transfer gear means coupling the output face of the second double-face gear and the first output gear;
   second transfer gear means mounted on the spider for pivoting with the spider, the second transfer gear means coupling the output face of the second double-face gear and the second output gear, the second transfer gear means being identical to the first transfer gear means; and
   a second input gear coupled directly to the spider for pivoting the spider.

8. A transmission as recited in claim 7 wherein the first transfer gear means comprises at least a pair of bevel gears engaging the first double-face gear and the first output gear, and the second transfer gear means comprises at least a pair of bevel gears engaging the second double-face gear and the second output gear.

9. A transmission as recited in claim 8 wherein the spider comprises a shaft and a pair of spaced apart identical hubs wherein the first transfer gear means is mounted on a first one of said hubs and the second transfer gear means is mounted on the second of said hubs.

10. A transmission as recited in claim 9 wherein each drive train comprises a ring gear, the output gear is a sun spur gear, and the transfer gear means comprises at least a pair of planetary spur gears engaging the ring gear and the output sun gear.

11. A balanced steerable transmission suitable for tracked vehicles or the like comprising:
    a housing;
    a first output drive shaft extending through the housing;
    a first output gear on the first output drive shaft including a bevel gear face;
    a first double-face gear coaxial with the first output drive shaft, the double-face gear having an input bevel gear face and an output bevel gear face, the output bevel gear face being substantially identical to the first output bevel gear face;
    at least one first transfer bevel gear engaging the output bevel gear on the first double-face gear and the first output bevel gear face;
    a second output drive shaft extending through the housing;
    a second output gear on the second output drive shaft including a bevel gear face and coaxial with the first output gear;
    a second double-face gear coaxial with the second output drive shaft, the double-face gear having an input bevel gear face and an output bevel gear face, the output bevel gear face being substantially identical to the second output bevel gear face;
    at least one second transfer bevel gear engaging the output bevel gear on the second bouble-face gear and the second output bevel gear face;
    a first input shaft extending through the housing;
    a first input bevel gear on the input shaft and engaging the input faces of each of the double-face gears;
    spider means comprising a unitary body mounted for pivoting in the housing about an axis coaxial with the output gears;
    means on the spider for mounting the first transfer bevel gear for pivoting with the spider, with the axis of the first transfer gear perpendicular to a pivot axis of the spider;
    means on the spider for mounting the second transfer bevel gear for pivoting with the spider, with the axis of the second transfer gear perpendicular to a pivot axis of the spider;
    a second input shaft;
    a second input gear on the second input shaft coupled directly to the spider for pivoting the spider.

12. A transmission as recited in claim 11 wherein the spider comprises a shaft and a pair of spaced apart hubs, the first and second transfer gears being mounted on the two hubs respectively.

13. A balanced steerable power transmission suitable for tracked vehicles or the like comprising:
    a housing;
    a first output shaft extending through the housing in a first direction;
    a first output spur gear on the first output shaft;
    a first double-face gear having an input gear face and an output ring gear face coaxial with the first output shaft;

a first planetary spur gear engaging the ring gear face on the first double-face gear and the output spur gear;

a second output shaft coaxial with the first output shaft and extending through the housing in a second direction;

a second output spur gear on the second output shaft;

a second double-face gear having an input gear face and an output ring gear face coaxial with the second output shaft;

a second planetary spur gear engaging the ring gear face on the second double-face gear and the output spur gear;

a spider mounted in the housing for pivoting as a unitary body about an axis coaxial with the output shafts;

means on the spider for mounting the planetary gears for rotation about axes parallel to the spider axis and offset therefrom and for pivoting with the spider in a single direction around the spider axis;

a first input shaft extending through the housing;

a first input gear on the first input shaft coupled to the input gear face on each of the double-face gears;

a second input shaft extending through the housing; and a second input gear on the second input shaft coupled directly to the spider for pivoting the spider.

14. A transmission as recited in claim 13 comprising a bevel gear face on the spider coupled to the second input gear.

15. A transmission as recited in claim 13 wherein the spider comprises a shaft and a central hub and wherein the first and second planetary gears are mounted on said hub.

16. A transmission as recited in claim 7 wherein the spider comprises a shaft and a central hub and wherein the first and second transfer gear means are mounted on said hub.

* * * * *